Figure 3:
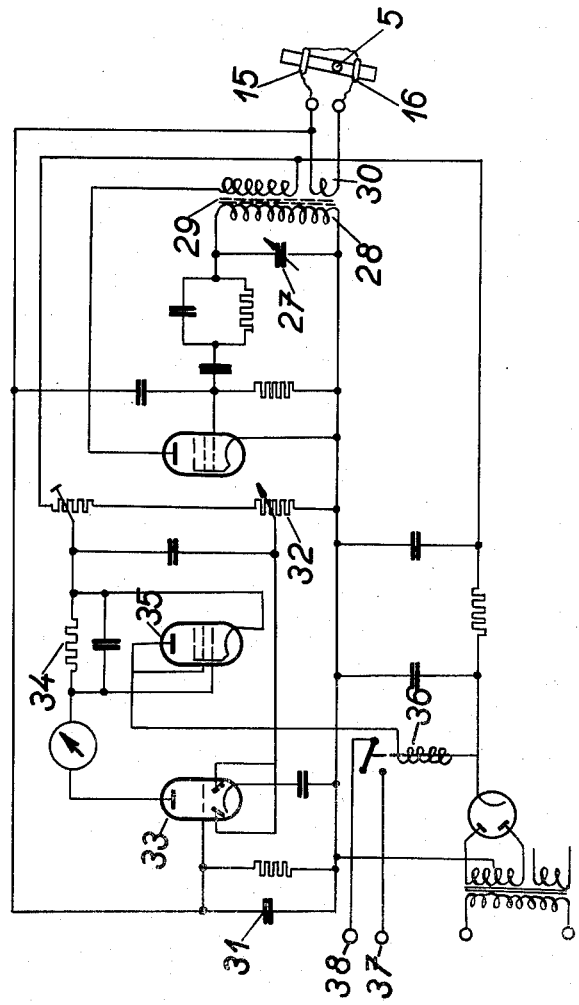

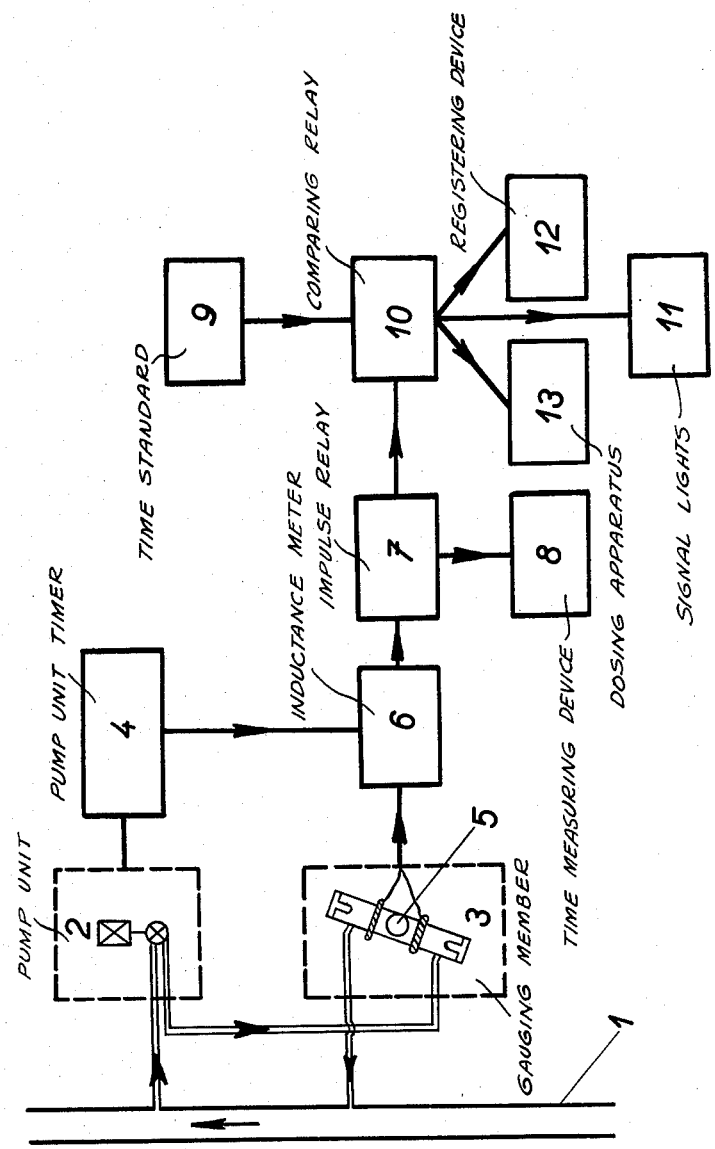

Oct. 11, 1960   B. CIHELKA ET AL   2,955,459
DEVICE FOR AUTOMATIC PERIODIC GAUGING OF VISCOSITY
Filed Aug. 29, 1957   3 Sheets-Sheet 3

INVENTORS
Bohuslav Cihelka, Otakar Herman
BY

United States Patent Office 2,955,459
Patented Oct. 11, 1960

2,955,459

DEVICE FOR AUTOMATIC PERIODIC GAUGING OF VISCOSITY

Bohuslav Cihelka, 5 Malirska, Prague VII, Czechoslovakia, and Otakar Heřman, 6 Braunerova, Prague VIII, Czechoslovakia Filed Aug. 29, 1957, Ser. No. 681,101

Claims priority, application Czechoslovakia Oct. 18, 1956

3 Claims. (Cl. 73—57)

The present invention relates to a device for automatic periodic gauging and registering of changes in the viscosity of transparent as well as opaque liquids, and more particularly of coating materials, and for dosing of a solvent into the liquid for the purpose of maintaining a required viscosity. The duration of the dropping movement of a measuring ball in a glass tube filled with the liquid, which duration is an indication of viscosity, is registered at a remote point on an indicator as a result of changes in the inductance of coils wound on the gauging tube.

The viscosity of paint material in large vessels or tubs in paint shops has up to now been ascertained manually during operation, by taking and measuring a sample of the paint material. According to the obtained result, the paint material has then been adjusted manually, by the addition of a thinner, in accordance with the viscosity required by the technological process. This tedious manipulation requires conscientious and reliable servicing, as the viscosity of the material, e.g. in tubs, has to be checked and adjusted several times a day. Solvents evaporate permanently from the surface of the paint material, the latter becomes more viscous and even the smallest change in viscosity exerts an influence upon the quality of the paint coat. There are still many shops where viscosity is not checked at all or is determined by mere estimate, which affects, of course, also the resulting paint coat. With the increasing mechanization of paint shops, checking the viscosity of paint materials and keeping it at the required level becomes an indispensable requirement.

The present invention relates to an apparatus for automatic gauging of viscosity with remote indication, registration and dosing of predetermined quantities of a thinning agent.

It is an advantage of the invention that it entirely removes human labour from the whole process and that it provides for an automatic gauging of viscosity, both of transparent and opaque liquids, with a high degree of accuracy.

The apparatus is at the same time capable of replacing the evaporated thinner, e.g. in tubs (in the process of applying paint materials by submersion) and registers on a circular registration card the viscosity changes as compared with a set standard. The use of the apparatus makes possible the employment of up-to-date mechanized methods for the application of paint materials, which save great quantities of such materials. In all such processes a frequent control and maintenance of the viscosity at a predetermined level are indispensable.

According to the invention the automatic periodic gauging, comparing, maintaining, and registering of changes in the viscosity of transparent and opaque liquids is carried out by automatically measuring the duration of fall of a gauging ball through a tube having spaced apart gauging coils extending therearound so as to have their inductance varied as the ball passes therethrough, by an evaluation of the obtained pulses in a comparing relay, registration of deviations of the measured viscosity from a set standard and simultaneous automatic preservation of the viscosity on the required level by supplementing the measured liquid with solvents.

Figure 4:
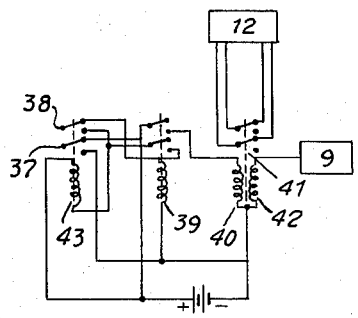
Figure 5:
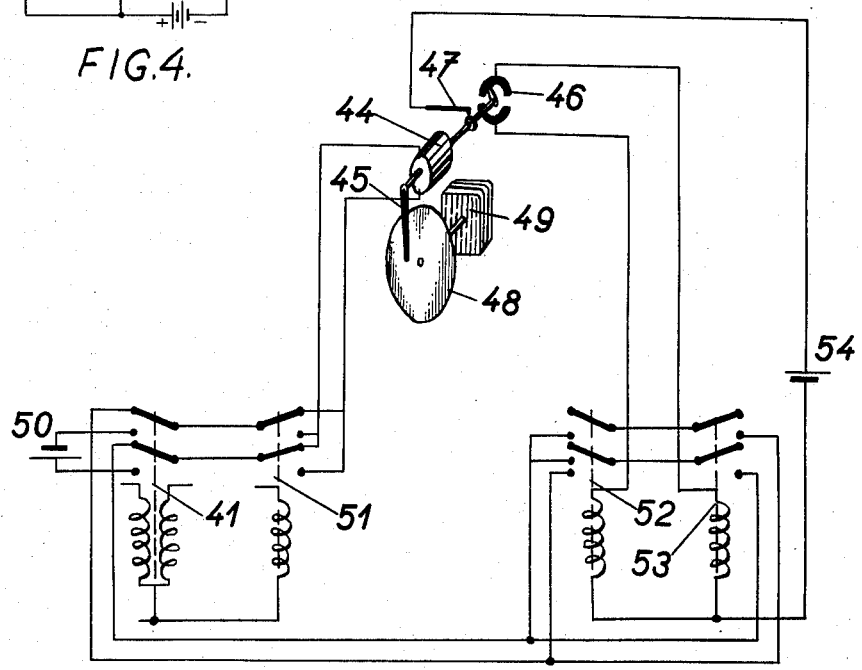
Figure 2:
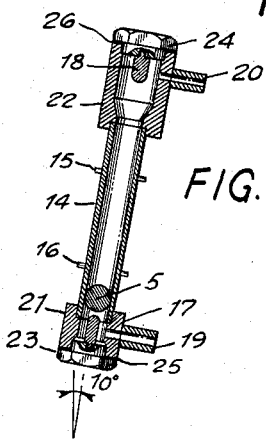

The accompanying drawings show by way of example a preferred embodiment of an apparatus according to the present invention, wherein Fig. 1 is a block diagram of an automatic viscometer, Fig. 2 is a longitudinal sectional view of a gauging member of the viscometer of Fig. 1, Fig. 3 is a wiring diagram showing the bridge of the inductance meter included in the viscometer of Fig. 1, Fig. 4 is a wiring diagram of the comparing relay of the viscometer of Fig. 1, and Fig. 5 is a combined wiring diagram and schematic view of the registration apparatus included in the viscometer of Fig. 1.

The general arrangement of an automatic viscometer embodying the invention is represented in a diagrammatic way in Fig. 1. The measured liquid flows through a conduit 1 (or is contained in a vessel). The liquid is pumped by a pumping unit 2 through a gauging member 3 and then back into the conduit or vessel 1. At predetermined time intervals, which depend on the adjustment of an automatic timing apparatus 4, the pump 2 is put out of operation and circuits of gauging coils in the gauging member 3 are closed. The halt in the flow of the liquid through the gauging member 3 permits a ball 5 therein to fall past the gauging coils. At the moment when the ball passes through the first coil, an inductance meter 6 and an impulse relay 7 cause operation of an electric time measuring device 8 of a known design, with the device 8 being stopped at the moment when the ball passes through the second coil. The required time of fall to be compared with the actual time of fall of the ball 5 is adjusted in the time standard 9.

The two periods of time (the actual duration of fall of the ball and the set standard) are compared in a comparing relay 10 and the result is signalled by colored lights 11, which indicate the differences of the actual duration of fall from the set standard. The comparison is transmitted to a registering device 12, which registers the changes and to a dosing apparatus 13, which adds the required amount of solvent to the liquid in the vessel or conduit, in order to maintain the viscosity at the required value.

Fig. 2 shows the detailed structure of gauging member 3 of the viscometer. Its main part comprises a glass tube 14 inclined at an angle of 10° from the vertical and housing a metal ball 5. Wound on the tube 14 at longitudinally spaced apart locations are two equal coils 15 and 16. The ball 5 in its lowest position rests on a supporting pin 17. When measured liquid is made to flow upwardly through the tube 14 by the operation of the pump unit 2, the ball 5 is pushed into the top portion of the tube and retained there by the influence of the flow of liquid and abuts against an abutment pin 18. During each period of measurement of the viscosity, the flow of liquid stops and the ball 5 starts to fall freely through the gauging tube 14; and the coils 15 and 16 are connected to the inductance meter 6 which emits pulses exactly corresponding to the passage of the ball through the coils, with the ball finally coming to rest on the lower abutment pin 17. The liquid is admitted to the tube 14 through the lower neck 19 and flows out through an upper neck 20 during operation of pump unit 2. Both necks 19 and 20 are provided in side-walls of end-sleeves 21 and 22, which carry closures 23, 24 with seals 25, 26, the closures being removable for the purpose of cleaning the gauge tube 14.

Fig. 3 represents a bridge of the inductance meter 6 for the production of pulses, the meter comprising an oscillator, a vacuum tube voltmeter and an amplifier. The oscillator comprises a condenser 27 connected to the secondary coil 28 of a transformer having primary coils 29 and 30, and is tuned to the frequency at which resonance takes place in an oscillation circuit. The oscillation circuit comprises the gauging coils 15, 16 and a condenser 31. The sensitivity of the bridge may be regulated by means of a potentiometer 32. The generated voltage is measured with a vacuum tube voltmeter 33 connected in a known way. The voltage difference on a resistance 34 is fed to the grid of a tube 35, so that no anode current flows through the latter. Because of the passage of the ball 5 through the coil 15 or 16 the resonance of the two circuits is disturbed, the voltage on the resistance 34 drops and anode current starts to flow through the tube 35, causing the relay 36 to be closed. Thus, the relay 36 is closed when the ball passes through coil 15 and again when the ball passes through coil 16.

Fig. 4 shows the internal arrangement of the comparing relay 10. At the first closure of relay 36 a circuit 37, 38 is established and positive voltage appears on the winding of the relay 39, which attracts its armature. Positive voltage appears in this way also on one winding 40 of a comparing relay 41. At the same time, however, positive voltage is brought from the time standard 9 to the other winding 42 of the relay 41. Both windings magnetize the core of the relay 41 in opposite directions, with the result that the relay 41 does not become closed. A relay 43 receives at the same time positive voltage at both ends of its winding and also remains inoperative. After the ball 5 has passed through the coil 15 or 16, the relay 36 is opened to interrupt the supply of positive voltage, so that the relay 43 attracts its armature, current starts to flow through the windings of the relay 43 and of the relay 39 keeping the armatures of both relays attracted. When the relay 43 attracts its armature, the polarity of the circuit 37, 38 is changed. Upon a subsequent closing of the relay 36 negative voltage appears at both ends of the winding of the relay 39, which becomes disengaged, and interrupts the current flowing to the first winding 40 of the relay 41 while its winding 42 is magnetized by the current from the time standard 9, whereupon the relay 41 is closed. If the pulse produced by the measuring ball 5 upon its passage through the coils 15, 16 is of the same length as the pulse set by the time standard 9, the voltages in both windings 40 and 42 are interrupted simultaneously, and the relay 41 remains inoperative. Attached to the contacts of the relay 41 is the registering apparatus 12.

Fig. 5 shows the arrangement of the registering apparatus 12, which comprises a reversible electric motor 44 which drives an arm with a stylus 45, a segment change-over switch 46 and a collector ring 47. A registration disc 48 is driven by an electrically wound clock work 49 of a known design. When the relay 41 is closed, it connects the motor 44 to a battery 50. The motor 44 starts revolving in that direction which corresponds to the momentary position of the contacts of a relay 51. The relay 51 is attracted only if current flows through the winding 40 of the relay 41. When the duration of the dropping movement of the ball 5 between the coils 15 and 16 is shorter or longer than the time set on the time standard 9, the stylus 45 is deflected to one side or the other of its normal or basic position. After completion of a full measuring cycle the relay 41 falls off, with the result that the stylus 45 returns to its basic position by reversal of the direction of movement of the motor 44. The reversal of movement of the motor 44 is caused by the closing of a relay 52 or 53. The closing of one or the other of these relays depends on the position of the segment switch 46. The current for the relay 52 or 53 flows from a battery 54 over one or the other segment of the switch 46 and the collector ring 47.

The apparatus according to the invention may be used for automatic periodical measurement of the viscosity of transparent as well as opaque liquids, for maintaining the required viscosity by automatic dosing of solvents into the measured liquid and for registering deviations of the measured viscosity from the required viscosity. The dosing apparatus 13 which is only represented schematically in Fig. 1 may include a conventional mechanical time relay 10 and regulating the operation of an electrically driven pump which pumps a predetermined dose of solvent into the conduit 1 whenever the measurement of the viscosity indicates the need therefor.

The apparatus is suitable for use in all workshops, where a frequent checking of viscosity or maintaining of viscosity on a required level is indispensable. The design of the apparatus as described above has been adapted for use in connection with coating materials, but the apparatus may also be used in the oil and chemical industries.

The use of the apparatus leads to considerable saving of the time required on the one hand for periodic measurements of viscosity and on the other hand for the manual thinning down of the measured liquid to the required viscosity (e.g. in paint shops). Apart from the time saved, the use of the apparatus according to the invention in paint-shops results also in an improvement of the quality of paint-coats (e.g. when coating materials are applied by submersion or spraying, or when the coating materials are prepared centrally), while permitting full utilization of such up-to-date mechanized technology of application of coating materials.

The automatic viscometer according to the invention eliminates entirely the influence of the human factor on the measuring process and on maintaining the viscosity at a constant level.

We claim:

1. A device for effecting the automatic, periodic measurement and registration of the changes in viscosity of transparent and opaque liquids with respect to a predetermined value of viscosity, comprising a measuring member including a tube containing the liquid to be measured and having one end elevated with respect to the other end of said tube, a ball in said tube gravitationally urged to fall through the liquid in the tube toward said other end and coils extending around said tube at locations spaced apart along the latter and having their inductance varied by the passage of the ball therethrough, pump means operative to cause a flow of the liquid through said tube in the direction from said other end toward said one end at a rate sufficient to retain said ball at said one end, control means for said pump means periodically interrupting the operation of the latter and thereby permitting said ball to fall from said one end of the tube, impulse relay means connected to said coils and producing electric pulses corresponding, with respect to time, to the occurrence of the variation of the inductance of the coils by the passage of said ball through the latter, standard setting means emitting pulses of predetermined duration corresponding to the time required for the fall of said ball past both of said coils through a liquid having a desired viscosity, comparing relay means receiving said pulses from the impulse relay means and said standard pulses and including a control relay which is actuated in response to a difference between the durations of said pulses from the impulse relay means and said standard pulses which is indicative of a variation of the actual viscosity of the liquid with respect to said desired viscosity, and means operated by actuations of said control relay to indicate the relationship of the actual viscosity to the desired viscosity.

2. A device as in claim 1; further comprising dosing means operated by actuation of said control relay to add a diluent to the liquid when the actuation of said control relay indicates that the actual viscosity of the liquid is greater than said desired viscosity.

3. A device as in claim 1; wherein said measuring member further includes a lower casing receiving said other end of the tube and an enlarged upper casing receiving said one end of the tube, each of said casings having a removable cap to facilitate cleaning of the tube with an abutment extending axially from each cap for engagement by said ball, said lower and upper casings further having inlet and outlet passages for the liquid opening adjacent the abutments of the related caps so that said abutments prevent blocking of said passages by said ball.

References Cited in the file of this patent

UNITED STATES PATENTS

| | | |
|---|---|---|
| 2,168,386 | Bell | Aug. 8, 1939 |
| 2,252,572 | Lang | Aug. 12, 1941 |
| 2,388,387 | Cohen | Nov. 6, 1945 |
| 2,630,819 | Norcross | Mar. 10, 1953 |

OTHER REFERENCES

Journal of Scientific Instruments, volume 26, March 1949, pages 75 and 76.